(12) United States Patent
Miller et al.

(10) Patent No.: US 6,625,652 B1
(45) Date of Patent: Sep. 23, 2003

(54) SYSTEM AND METHOD FOR HOST LIST PRUNING

(75) Inventors: C. Kenneth Miller, Concord, MA (US); Marc White, Wayland, MA (US); Kevin McKenna, Westford, MA (US)

(73) Assignee: The Fantastic Corporation, Zug (CH)

( * ) Notice: Subject to any disclaimer, the term of this patent is extended or adjusted under 35 U.S.C. 154(b) by 0 days.

(21) Appl. No.: 09/274,574

(22) Filed: Mar. 23, 1999

Related U.S. Application Data

(63) Continuation-in-part of application No. 09/012,386, filed on Jan. 23, 1998, now Pat. No. 6,151,696, which is a continuation-in-part of application No. 08/585,948, filed on Jan. 16, 1996, now Pat. No. 5,727,002, which is a continuation-in-part of application No. 08/375,493, filed on Jan. 19, 1995, now Pat. No. 5,553,083.

(51) Int. Cl.[7] .............................................. G06F 15/16
(52) U.S. Cl. ..................... 709/227; 709/219; 709/204
(58) Field of Search ................................ 370/261, 390; 713/163; 709/204–205, 219, 227–228

(56) References Cited

U.S. PATENT DOCUMENTS

| | | | |
|---|---|---|---|
| 4,491,947 A | 1/1985 | Frank ........................... 370/323 |
| 4,493,021 A | 1/1985 | Agrawal et al. ............. 709/236 |
| 4,554,656 A | 11/1985 | Budrikis et al. ............. 370/445 |
| 4,642,758 A | 2/1987 | Teng ............................ 707/10 |
| 4,759,015 A | 7/1988 | Takai et al. .................. 370/216 |
| 4,888,767 A | 12/1989 | Furuya et al. ............... 370/243 |
| 4,914,654 A | 4/1990 | Matsuda et al. ............. 370/522 |
| 4,937,819 A | 6/1990 | King ........................... 370/442 |
| 4,979,165 A | 12/1990 | Dighe et al. ................. 370/416 |
| 5,296,936 A | 3/1994 | Pittas et al. ................. 358/407 |
| 5,404,505 A | 4/1995 | Levinson ..................... 707/10 |
| 5,491,691 A | 2/1996 | Shtayer et al. ......... 370/395.42 |
| 5,553,083 A | 9/1996 | Miller ........................ 714/748 |
| 5,572,678 A | 11/1996 | Homma et al. .............. 709/227 |
| 5,696,764 A | 12/1997 | Soumiya et al. ........ 370/395.41 |
| 5,727,002 A | 3/1998 | Miller et al. ................. 714/748 |
| 5,748,736 A * | 5/1998 | Mittra ........................... 380/21 |
| 6,078,954 A * | 6/2000 | Lakey et al. ................. 709/223 |
| 6,085,251 A * | 7/2000 | Fabozzi, II .................. 709/230 |
| 6,151,696 A * | 11/2000 | Miller et al. ................. 714/748 |
| 6,453,438 B1 * | 9/2002 | Miller et al. ................. 714/749 |

FOREIGN PATENT DOCUMENTS

| | | |
|---|---|---|
| EP | 0 303 830 A2 | 2/1989 |
| EP | 0 437 072 A1 | 7/1991 |
| EP | 0 552 794 A2 | 7/1993 |
| EP | 0 632 671 A3 | 4/1995 |
| WO | 91/13503 | 2/1991 |
| WO | 95/26088 | 10/1995 |

OTHER PUBLICATIONS

Obraczka, K., Multicast transport protocols: a survey and taxonomy. IEEE Communications Magazine, vol. 36, No. 1, pp. 94–102, Jan. 1998.*

(List continued on next page.)

*Primary Examiner*—Andrew Caldwell
(74) *Attorney, Agent, or Firm*—Darby & Darby

(57) ABSTRACT

To make registration and confirmation of groups and confirmation of data transmission more scaleable, particularly for large groups, the size of a host list pruned in subsequent transmission. This host list management can be achieved by (a) creating a message that includes a list of one or more receivers;(b) sending the message over a network; (c) receiving over the network one or more replies from one or more of the receivers; (d) identifying each receiver for which one of the replies was received and establishing another message that includes the list with the identified receivers; (e) sending the message established in step (d) over the network; (f) creating a modified list by removing the identified receivers from the list; and (g) if there are one or more receivers on the modified list, repeating steps (c), (d), (e), (f), and (g) using the modified list as the list.

20 Claims, 10 Drawing Sheets

Host List Pruning

OTHER PUBLICATIONS

International Searching Authority/European Patent Office, International Search Report, Dec. 5, 1996, for PCT/US96/00634, 11 Pages.

International Searching Authority/European Patent Office, Invitation to Pay Additional Fees and Partial Interantional Serach Report, Jul. 22, 1996, for PCT/US96/00634, 6 pages.

Draft Standard 802.1E, System Load Protocol, ANSI and Joint Technical Committee of the ISO and the IEC, 1990, 64 pages.

Comer, Internetworking with TCP/IP, vol. I, Principles, Protocols, and Architecture, Second Edition, Prentice Hall, 1991, Chapter 23, pp. 377–390.

Waters et al., Broadcast File Distribution Protocols for Satellite Networks, IEEE Telecommunications Conference, pp. 133–138, 1989.

Henriksen et al., A Transport Protocol Supporting Multicast File Transfer Over Satellite Links, International Phoenix Conference on Computers and Communications, pp. 590–596, 1992.

"IBM Japan Develops New Communication Protocol", news article, Nov. 3, 1995.

"TRIView Manger" brochure by Tactix ReEngineering, four pages.

A New ARQ–Scheme for Multicast Satellite Communication, by U. Quernheim et al., 3rd European Conference on Satellite Communications, Nov. 1993, pp. 11–15.

Electronics Letters, vol. 24, No. 11, May 26, 1988, "Continuous Multidestination ARQ Schemes for High Error–Rate Channels", pp. 694–695.

"Host Extensions for IP Multicasting", by S. Deering, Aug. 1989, pp. 1–17.

"The Internet Multicasting Service", RELease 1.0, v94, n2, p10(6), Feb. 18, 1994, Dialog printout.

IEEE Computer Society, Oct. 1994, "Multicast Transport Protocols For High Speed Networks", by S. Paul et al., pp. 4–14.

IEEE Trnasactions on Communications, vol. 41, No. 12, Dec. 1993, "Optimal Adaptive Multireceiver ARQ Protocols" by Wang et al., pp. 1816–1829.

IEEE Transactions of Communications, vol. Com–33, No. 3, Mar. 1985, "Multidestination Protocols for Satellite Broadcast Channels", by Sabnani et al., pp. 232–240.

IEEE Transactions on Communications, vol. 41, No. 5, May 1993, "Error and Flow Control Performance of a High Speed Protocol", B. Doshi et al., pp. 707–720.

IEEE Transactions on Communications, vol. COM–33, No. 3, Mar. 1985, "Multidestination Protocols for Satellite Broadcast Channels", Sabnani et al., pp 232–240.

Stanford University, "Host Extensions for IP Multicasting", S. Derring, Aug. 1989, pp. 1–17.

3rd European Conference on Satellite Communications, Nov. 1993, "New ARQ–Scheme for Multicast Satellite Communication", Quernheim et al., pp–11–15.

Shacham, "Multipoint Communication by Hierarchically Encoded Data", INFOCOM 1992, pp. 2107–2114.

Shachum, "Multicast Routing of Hierarchical Data", 1992, pp. 1217–1221.

International Searching Authority/European Patent Office, International Search Report, Dec. 18, 1997, for PCT/US97/15040, 6 Pages.

Ken Miller et al., "Starburst Multicast File Transfer Protocol (MFTP) Specification," IETF Internet draft at www.ierf.org. Apr. 1998, pp. 1–52.

Starburst White Paper, "Starburst MFTP—An Efficient, Scalable Method for Distributing Information Using IP Multicast," available at www.starburstcom.com/white.htm, 1997, pp. 1–6.

* cited by examiner

Host List Pruning

SYSTEM AND METHOD FOR HOST LIST PRUNING

CROSS-REFERENCE TO RELATED CASES

This application is a continuation-in-part of U.S. patent application Ser. No. 09/012,386, filed Jan. 23, 1998, now U.S. Pat. No. 6,151,696, which is a continuation-in-part of U.S. patent application Ser. No. 08/585,948, filed Jan. 16, 1996, now U.S. Pat. No. 5,727,002, which is a continuation-in-part of U.S. patent application Ser. No. 08/375,493, filed Jan. 19, 1995, now U.S. Pat. No. 5,553,083 which is being re-examined as of Jun. 26, 1998 under U.S. Re-examination Control No. 90/005,028. Each of these patents and patent applications is incorporated by reference.

TECHNICAL FIELD

This invention generally relates to data transmission and to efficient and reliable multicast transmissions of files from a server to clients.

BACKGROUND INFORMATION

Computer networks, such as wide area networks (WANs) using the TCP/IP protocol suite, can provide unicast, multicast, and broadcast services to allow communication between network participants such as a server node and one or more client nodes. IP supports the sending of data to broadcast addresses, which are delivered to all hosts on the network or subnetwork at the expense of creating traffic over the total network. IP also supports multicast technology to communicate over a computer network. The term "broadcast" refers to a server node sending information to all of the client nodes connected to the network. The term "multicast" refers to a server node sending information to a subset of all of the client nodes connected to the network.

Some information providers provide information electronically by broadcasting or multicasting the information from a server node at a central location to one or more client nodes at remote customer locations via a computer network to which the server and the clients are coupled. Computer networks and systems use several different protocols to accomplish reliable data distribution. One common protocol suite in use in computer networks is TCP/IP, which is the protocol presently used with the Internet. TCP stands for Transmission Control Protocol, and IP stands for Internet Protocol.

Conventional TCP/IP reliable file transfer protocols support point-to-point (i.e., unicast) file distribution only. That is, packets are sent to each address in turn. In contrast, reliable multicast data transfer allows packets to be sent to several host recipients simultaneously, thereby saving bandwidth. A multicast group is the group of host recipients that simultaneously receive data via the reliable multicast data transfer. For example, with multicast, a data packet is sent to a participating router, and the router handles local distribution. Typical applications for reliable multicast data distribution include electronic software distribution, transmission of critical information to field offices, distribution of multimedia information to local servers, replication of web servers to the edges of networks for improved performance, and providing subscription based "push" information delivery to receivers who have signed up for a particular information service.

IP multicast groups are dynamic and can be set up and torn down in seconds. IP multicast session setup protocols that have been standardized support two basic group models for two basic multicast applications. One group model is the conferencing model, in which a host is "invited" to join a conference, and a many to many multicast group is set up. This conference can be a video conference, a data conference, or some other type of conference. A second group model is the broadcast model. This is analogous to television broadcast, where events and their times and "channels" are continuously broadcast over a particular channel, much as is done on many cable TV systems. Any receiver seeing an event may join the group and receive the information, in a manner analogous to tuning a TV receiver to the channel desired. Both of these models assume that anyone can access the groups with no restriction. There is no knowledge of group membership in the one to many group model, and there may not be knowledge in the conference model.

Neither of these group models satisfies the needs of commercial organizations that often want to restrict group membership and have central control of the group. Additionally, sessions are not always scheduled ahead of time, but a sender may want to set up a session at any time in an asynchronous manner.

SUMMARY OF THE INVENTION

Control of groups and their membership can be accomplished by establishing open and closed groups. Open groups permit anyone learning of the group to join, sometimes subject to certain limits, and closed groups define a known list of group members at the sender and direct receivers to join the group for the duration of the session. One issue is the setup and maintenance of the groups of receivers that receive information using multicast. A host list can be used to list all the group members, and this host list would accompany the information sent to the group members to direct them to join.

During setup of a group, host lists are sent to direct particular receivers to join a group. The host lists can also be sent during confirmation of group registration and during confirmation of data transmission. When groups reach sizes having thousands of members, however, the host list becomes quite large and takes more time than desirable (e.g., 15 minutes) for setup or confirmation. For example, for a group of 10,000, the host list could require 60 packets or more each time it is sent, and the host list might be sent multiple times as more registration messages are received. Consequently, this represents a significant scaling problem as groups become large. As group sizes increase, the large size of the list translates into unacceptably high network traffic required to transmit the large list and generally a waste of network capacity on an administrative task.

To make registration and confirmation of groups, and confirmation of delivery in reliable multicast data transfer sessions more scaleable, particularly for large groups, the host list is reduced at every sending according to the invention. By reducing the size of the host list, the network is not "clogged" with administrative messages, and session setup or delivery confirmation is accomplished quicker.

In one aspect, the invention features a method for managing a list of receivers, comprising (a) creating a message that includes a list of one or more receivers; (b) sending the message over a network; (c) receiving over the network one or more replies from one or more of the receivers; (d) identifying each receiver for which one of the replies was received and establishing another message that includes the list with the identified receivers; (e) sending the message established in step (d) over the network; (f) creating a modified list by removing the identified receivers from the list; and (g) if there are one or more receivers on the modified list, repeating steps (c), (d), (e), (f), and (g) using the modified list as the list.

Embodiments according to this aspect of the invention can include the following features. A confirmed list that includes all of the identified receivers can be established and data can be transferred over the network to the identified receivers on the confirmed list. Also, step (g) can be repeated until a predetermined condition occurs, such as a message limit is reached or a time limit is reached.

In another aspect, the invention provides a method of managing a list of receivers to establish a group list, comprising (a) receiving over a network one or more replies from one or more receivers; (b) identifying each receiver for which one of the replies was received in step (a); (c) adding the receivers identified in step (b) to a group list; (d) sending a message over the network, the message including a list of only the identified receivers added to the group list in step (c); and (e) repeating steps (a), (b), (c), (d), and (e) until a predetermined condition exists.

In still another aspect, the invention features a method of confirming the transfer and receipt over a network of data sent to a group of receivers, comprising (a) receiving over the network one or more confirmations from one or more receivers, each of the confirmations being an indication that one of the receivers has successfully received all of the data sent to that receiver over the network; (b) identifying each receiver of the group for which one of the confirmations was received in step (a); (c) sending a message over the network, the message including a list of only the receivers identified in step (b); and (d) repeating steps (a), (b), (c), and (d) until a predetermined condition exists.

The host list pruning method of the invention decreases the size of host lists on subsequent transmissions, greatly increasing scaleability, which is important as group size increases. Thus, the invention allows a host list to be used for registration and confirmation regardless of the size of the group, whereas existing mechanisms that use a host list will require an unacceptably high amount of time to set up the session and will use excessive network resources as the group size increases. This is accomplished without loss of confirmation of registration with a group or loss of confirmation of data transmission. In addition, because host list pruning effectively reduces the amount of data sent over the network between senders and receivers, it increases the likelihood that the data will be received correctly.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. The drawings are not necessarily to scale, emphasis instead being placed on illustrating the principles of the present invention.

DESCRIPTION

Figure 1:
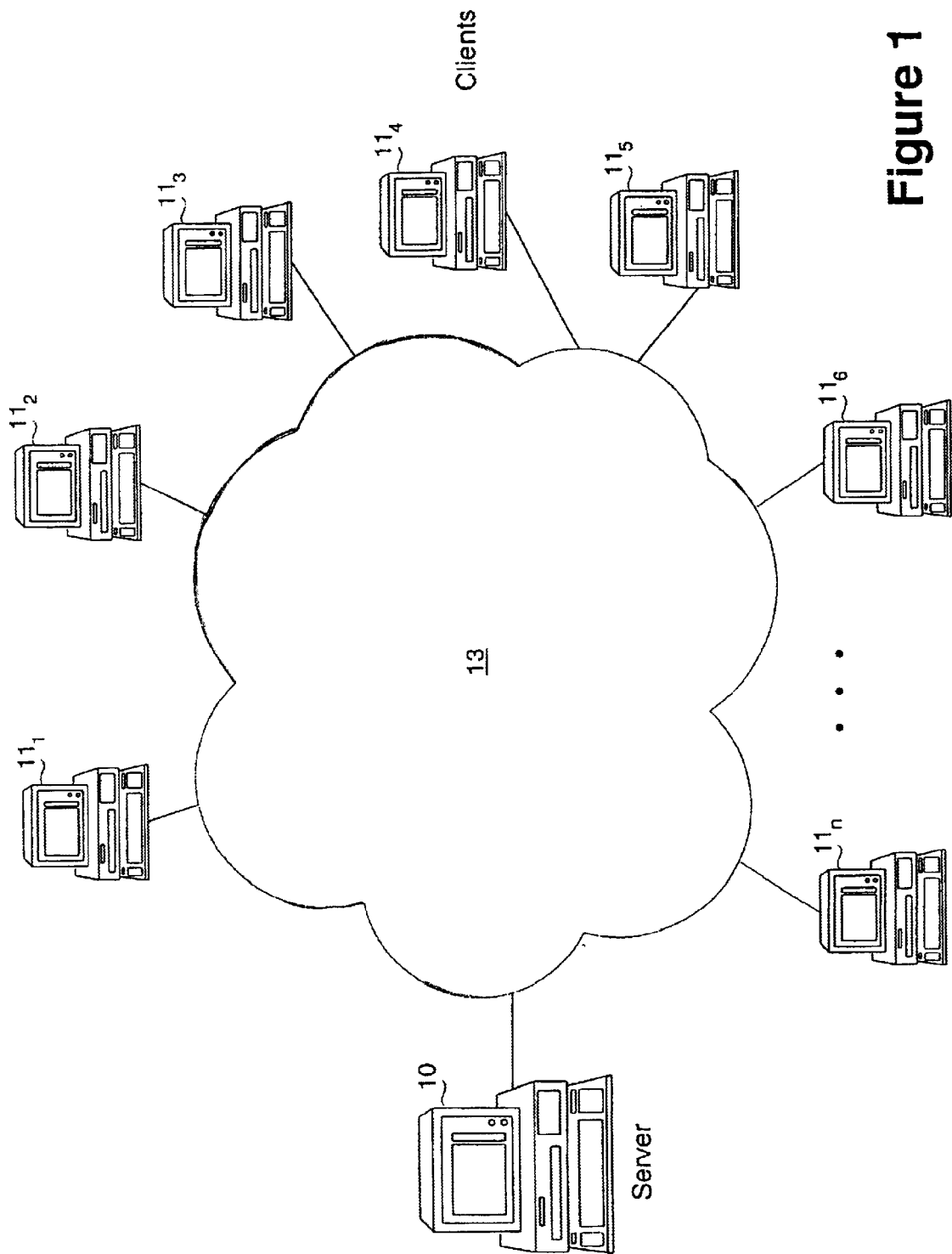
FIG. 1 is a simplified diagram of a physical configuration that allows a server to communicate with one or more clients.

Session setup of multicast applications generally uses a separate multicast group address. Members of a group are called hosts. A host list, therefore, is the list of hosts that are members of a group. Host lists are used in closed groups and open limited groups (which are defined below) at the server to track client status. Host lists also are used with closed groups to direct hosts to join a group.

As used in this specification, a server is an entity that sends data; thus, the term "server" is used interchangeably with the term "sender." Likewise, a client is an entity that receives data, and the term "client" is used interchangeably herein with the term "receiver," and the term "host." Note that, in some implementations of reliable multicast, such as the Multicast File Transfer Protocol (MFTP) of StarBurst Software, Concord Mass., a computer system can act in some instances as a sender of data and in other instances as a receiver of data. This is because the MFTP implementation defines both a send function (the server), which only transmits data products, and a receive function (the client), which only receives data products. Either or both functions can be provided in the MFTP implementation of reliable multicast. Thus, depending on which function is being used, a computer could be configured as either a client or a server at any particular time. However, regardless of the implementation of reliable multicast being used, the present invention assumes that the computer configured as a server and the computer configured as a client remain in that relationship with each other while data is being exchanged between them.

Moreover, references made herein to a receiver and/or a client will refer to the host, as well. As used in this specification, a sender is the entity that transmits a multicast message, and a receiver is the entity that receives a multicast message. Typically, receivers are identified by their IP address or alternatively by a special Global ID which in one embodiment is in the form of a Class E IP address, (IP address space not currently used). Global IDs are useful in situations when receivers may not have a permanent IP address but are assigned one whenever they connect to the network. A Global ID is an alternative method for identifying a host that may not have a permanent IP address. In one embodiment, the format is that of a Class E IP address, 32 bits long In MFTP's session setup, an announcement (e.g., an ANNOUNCE message) is the process of informing clients that a data transfer (i.e., a file sent from a server to clients) is about to start. This involves sending a message to the "well known" ANNOUNCE session setup multicast group address where client hosts have joined and are listening for such messages. The message identifies the data product, its size, name, etc. In one embodiment of the invention, the "well-known" address is a public address. The public address is relevant in multicast transmission because separate multicast addresses may be used for product announcement and delivery. Any number of servers may announce products to a single public address and any number of clients may join the multicast group defined by the public address. In another embodiment, the "well-known" address is a private address. The server specifies the Private Address in the ANNOUNCE message for each product transfer. Only clients that are authorized to receive a product actually join the multicast group defined by the private address.

In one embodiment of the invention, the ANNOUNCE message can include a list of clients that are allowed to receive the data included in the ANNOUNCE message. These clients, called authorized clients, are "authorized" by the application sending the ANNOUNCE to receive the data if the client finds its IP address or Global ID in the ANNOUNCE message. All other clients are prohibited from receiving the data. Authorized clients are used, in one embodiment of the invention, with closed groups (which are explained below).

In another embodiment, an ANNOUNCE message is retransmitted at regular intervals for a configured time period (e.g., 3 minutes). However, as one skilled in the art would recognize, the ANNOUNCE message can be transmitted in an infinite variety of ways (periodically, for a certain number of times, for a number of times that is dependent on external factors, etc.).

Registration is the process of a client informing a server that the client intends to participate in the product transmission that is currently being announced. The client does this by sending a REGISTRATION response message to the server. This response is sent to the address specified by the "Response Address" parameter in the ANNOUNCE message. The response address is the IP address to which clients send REGISTRATION messages, as well as Status, and DONE messages (which are explained later). The Response Address is specified in the ANNOUNCE message. The ability to specify an address other than the server's address allows an intermediate entity to perform aggregation/relaying of the responses.

After the product announcement phase is completed, the server begins the transmission of the product. Product delivery is the process of transmitting the data product from a server to clients. The data is transmitted in data transfer units (DTU). A group of DTUs is called a block. The transmission of the entire data product once is called the first pass. No DTU retransmissions occur during the first pass. Rather, additional passes are made when retransmissions are required. However, only the missed DTUs are retransmitted on each subsequent pass. This phase is always preceded by the product announcement phase described above.

When data transmission is complete, the client sends a DONE message to the server to indicate that the client has received a complete data product. The server maintains a completion list of clients that have confirmed receipt of a data product and sends out a completion message to the clients to indicate that it confirms that the client has received a complete data product.

FIG. 1 illustrates, in accordance with the invention, a basic diagram of quick and reliable data transmission from a source or server 10 to one or more recipients or receivers or clients $11_1$, $11_2$, . . . $11_N$ over a communications link 13. In the first pass, the server 10 preferably either broadcasts the file to all of the clients 11 or multicasts it to a subset of all of the clients 11. The link 13 can be a computer network (e.g., a LAN, a WAN, the Internet), a wireless network (e.g., a cellular data network), some combination of these two types of communication mediums, or some other communication medium. The plurality of frames transmitted over the link 13 during the first round can together represent a computer data file being transferred from the server 10 to one or more of the clients 11.

Figure 2:
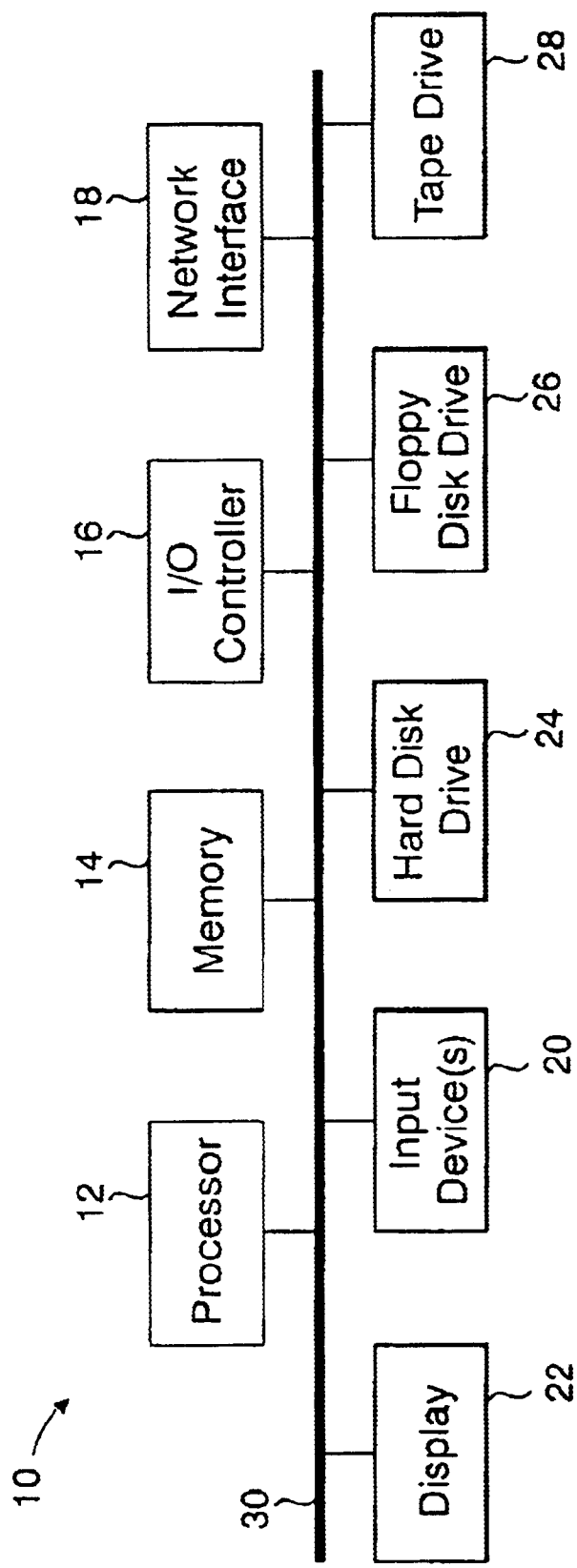
FIG. 2 is a simplified block diagram of a computer system in which at least a portion of the present invention can be embodied.

The server 10 and the clients 11 can be computers, such as PCs or workstations, running any one of a variety of operating systems. Referring to FIG. 2, the server 10, regardless of what type of computer it is, typically includes a central processor 12, a main memory unit 14 for storing programs and/or data, an input/output controller 16, a network interface 18, one or more input devices 20 such as a keyboard and a mouse, a display device 22, a fixed or hard disk drive unit 24, a floppy disk drive unit 26, a tape drive unit 28, and a data bus 30 coupling these components to allow communication there between. Each of the client computers 11 generally includes all or some of the components included in the server 10 of FIG. 1, as shown in FIG. 2.

In some embodiments, one or more computer programs define the operational capabilities of the server 10 and the clients 11. The programs can be loaded into the server 10 and the clients 11 via the hard drive 24, the floppy drive 26, and/or the tape drive 28. Alternatively, the programs can reside in a permanent memory portion (e.g., a ROM chip) of the main memory 14. In some other embodiments, the server 10 and/or the clients 11 can include specially-designed, dedicated, hard-wired electronic circuits that perform all functions described herein without the need for instructions from computer programs. The invention can be used, for example, to load quickly and reliably new revision levels of the client software electronically from the server onto one or more of the clients.

Group management, in accordance with one embodiment of the invention, deals with how clients learn about and are joined to the public and private groups. Once a client 11 is joined to the public group, it learns about the private group in an ANNOUNCE message (ANNOUNCE messages are explained in greater detail herein). Two basic models for group types are used to join clients to the public address: closed and open. Group types are relevant to the invention because the host list pruning technique used (which is described later), in some embodiments, is dependent on the type of group.

Closed Groups

Closed groups are a form of group management where the server specifies the clients that are allowed to participate in the data transfer. All other clients are prohibited from receiving the data. In the closed model, the server 10 knows in advance which clients 11 are authorized to receive a data transmission. This allows the server to tightly control group membership. In one embodiment, this control occurs at two levels: (1) either by configuration or by use of a multicast protocol, the members of the group are restricted and (2) the product announcement itself includes a list of clients that are authorized to participate.

With closed groups, the sender (e.g., a server 10) creates a list of receivers (typically, each receiver corresponds to a client 11) that is a subset of the number of receivers that are listening to the ANNOUNCE multicast address. The public address may be known and configured in advance at the clients or the server may use the a multicast protocol to direct clients to join the public group. Thus, this type of group management is called closed group because the server restricts the membership of the group.

When the ANNOUNCE messageappears at the ANNOUNCE multicast address, the receivers designated to join the group register with the server by sending a REGISTRATION message, unless there is some legitimate reason not to, e.g., there is not enough disk space to store the transmission or the client has been configured to reject content from that source. In these cases, the receiver sends back a REGISTRATION message with a "Decline" code.

All other receivers (that is, receivers that are not members of the closed group) are administratively told not to join the group and thus do not receive the transmission. This is a server-centric mode of operation that allows the sender to tightly control which receivers receive the data and also minimizes the number of REGISTRATION messages arriving at the sender. It also allows the sender, in some embodiments, to keep detailed statistics on each receiver. For example, this mode is useful when the data product has a value associated with it that prevents it from being freely distributed.

At the end of a closed group transmission, DONE messages are sent from the receivers to the sender, confirming delivery. In one embodiment, the session ends when all receivers have acknowledged completion with a DONE message or when a configurable time-out occurs, whichever comes first. Other events can be used to trigger the end of the session, as those skilled in the art will recognize. Because of this control over group membership and data delivery, the sender has complete knowledge and control of the session in the closed group model. Thus, this is a preferred group model for many commercial applications. For example, a corporation may want to direct software updates to certain remote offices and then arrange for them to be installed remotely. The sender needs to designate which of the remote offices needs to receive this update and needs confirmation of reception. Business information dispersal within an organization typically needs a similar level of central control.

Open Groups

In the open group model, the receiving clients are not known to the server. However, a client generally is able to obtain the public group address of servers in which it is interested. Because the server is not determining those clients that join its session (that is, the clients are determining whether or not they join), this type of group management is called an open group. There are two variations of open groups, called "open limited" and "open unlimited", as discussed below.

The open limited group is a form of group management where the server does not specify which clients may participate in the data transfer. Any client that wishes to receive the data is required to register with the server. However, the server may limit the number of participants based on its own resources or some other criteria. Thus, the open limited mode allows the server to announce a transmission without specifying the clients that are authorized to receive the data, but can limit the number of receiving clients. The limitation may exist, in one embodiment, because the server does not know in advance which clients may want to receive the data, or the number of potential clients may be very large. In addition, in another embodiment, the server limits the number of actual participants based on some criteria determined by the application.

In this open limited group model, an ANNOUNCE message acts as an "advertisement" of the transfer. Any host listening on the ANNOUNCE multicast address may join. Those that join register with the server; thus, the server learns the identity of each client and can create a host list based on the registrations. Therefore, as with the closed group, the server is able to keep detailed statistics on each client that has joined the group. In fact, after the ANNOUNCE/REGISTRATION phase, protocol operation is identical to the closed group. That is, transmission of data and confirmation of completion with open limited groups is similar to that with closed groups.

Open limited is a looser form of group control than closed groups. In some embodiments, open limited groups are used when the information may not be as critical as with closed groups, and the central authority wants to provide some level of control to the receivers, while still providing centralized knowledge of who has received the information. In another embodiment, open limited is used when it is permissible to freely distribute the product, but the sender wants to know who is receiving it.

In contrast, the open unlimited group model is a form of group management where the server does not specify which clients may participate in the data transfer. Clients that wish to receive the data are not required to register with the server. The open unlimited model allows any client to participate in the data delivery and the server does not limit the number of participants. In this model, ANNOUNCE messages are sent, but there is no concept of registration. Thus, the sender has no knowledge of the members of the group receiving the data. This is similar to a television broadcast model and generally is used for transferal of information that can be available to anyone who wants it.

To achieve the open unlimited model, certain types of client responses are waived to prevent message implosion at the server. That is, no REGISTRATION or DONE messages are sent by the client. The only client response that is retained is the status response message "STATUS" either acknowledging receipt of data ("ACK") or negatively acknowledging receipt of data ("NAK") (that is, telling the server that it did not get the data). In one embodiment, clients send this message only for DTUs that are not received (i.e., send only NAKs), so there will not necessarily be a response from every client. The server is unable to identify each receiving client when this mode is used, so it is most useful when the data product can be freely distributed and the sender does not care to know who is receiving the product. More importantly, because the server is unable to identify each receiving client, there is no host list or completion list to prune, so the host list pruning technique is not applicable.

Data Transmission

Data transmission, in one embodiment of the invention, includes four aspects: IDLE, ANNOUNCE/REGISTRATION, TRANSFER, and COMPLETION. In the IDLE state there is no activity. When a collection of data (e.g., a file) is selected for transmission by the server 10, the ANNOUNCE/REGISTRATION phase is entered. Typically, during any of the four phases, all files are available to an operator at the server 10.

Product announcement (the ANNOUNCE/REGISTRATION phase) is the process of letting the client population know that a product is about to be transmitted. In the ANNOUNCE phase, the server announces to the clients that a file is about to be transferred and provides the parameters associated with the transfer of the file. That is, at a time determined by a user application at the server, a data product transmission is "announced" to the clients. The server transmits the ANNOUNCE message for this purpose. If multicast is being used, the message is sent to the public address. Otherwise, the message is sent in unicast or broadcast mode. The message identifies the product name, type, and other information about the transfer, including whether it is closed, open limited or open unlimited.

Product announcement consists of transmitting ANNOUNCE messages for a period of time or a number of times, followed by the data product itself. The ANNOUNCE message identifies the data product that will be transmitted, its size, and other parameters. The maximum duration of this phase usually is expressed in minutes or number of ANNOUNCE cycles, and it is configurable. For example, in one embodiment, the transmission interval is specified by an Announce Interval parameter, and the duration of the ANNOUNCE phase is specified by an Announce Time Limit parameter.

During setup of a group, host lists are sent as part of the ANNOUNCE, to direct particular receivers to join a group and to confirm registration to receivers that have already registered. As described previously, the host list is a list of group members that can also be sent during confirmation of group registration and during confirmation of data transmission. When groups reach sizes having tens of thousands or even hundreds of thousands of members, the host list becomes quite large and takes more time than desirable (e.g., 15 minutes) for setup. For example, for a group of 10,000, the host list could require 60 packets or more each time it is sent, and the host list might be sent multiple times as more registration messages are received. Consequently, this represents a significant scaling problem as groups become large. As group sizes increase, the large size of the list can take up a significant amount of the bandwidth and session set up time.

To make registration and confirmation of groups, and confirmation of data transmission in multicast more scaleable, particularly for large groups, the size of a host list is reduced in subsequent transmissions in accordance with the invention. In one aspect, the size of the host list is reduced through the technique of host list pruning, which is described below. In another aspect, the host list size effectively is limited by providing an exceptions report, also described below.

Host List Pruning

As explained in greater detail below, host list pruning is a method of "pruning" (i.e., reducing the size of) the host list of client IP addresses, or Group IDs in the section of a message (such as an ANNOUNCE or COMPLETION message) that defines a group while still confirming to receivers that their membership is acknowledged or that their DONE message is acknowledged. This technique reduces traffic and speeds up the session set up phase as it reduces the size of the list that needs to be transmitted.

Figure 3:
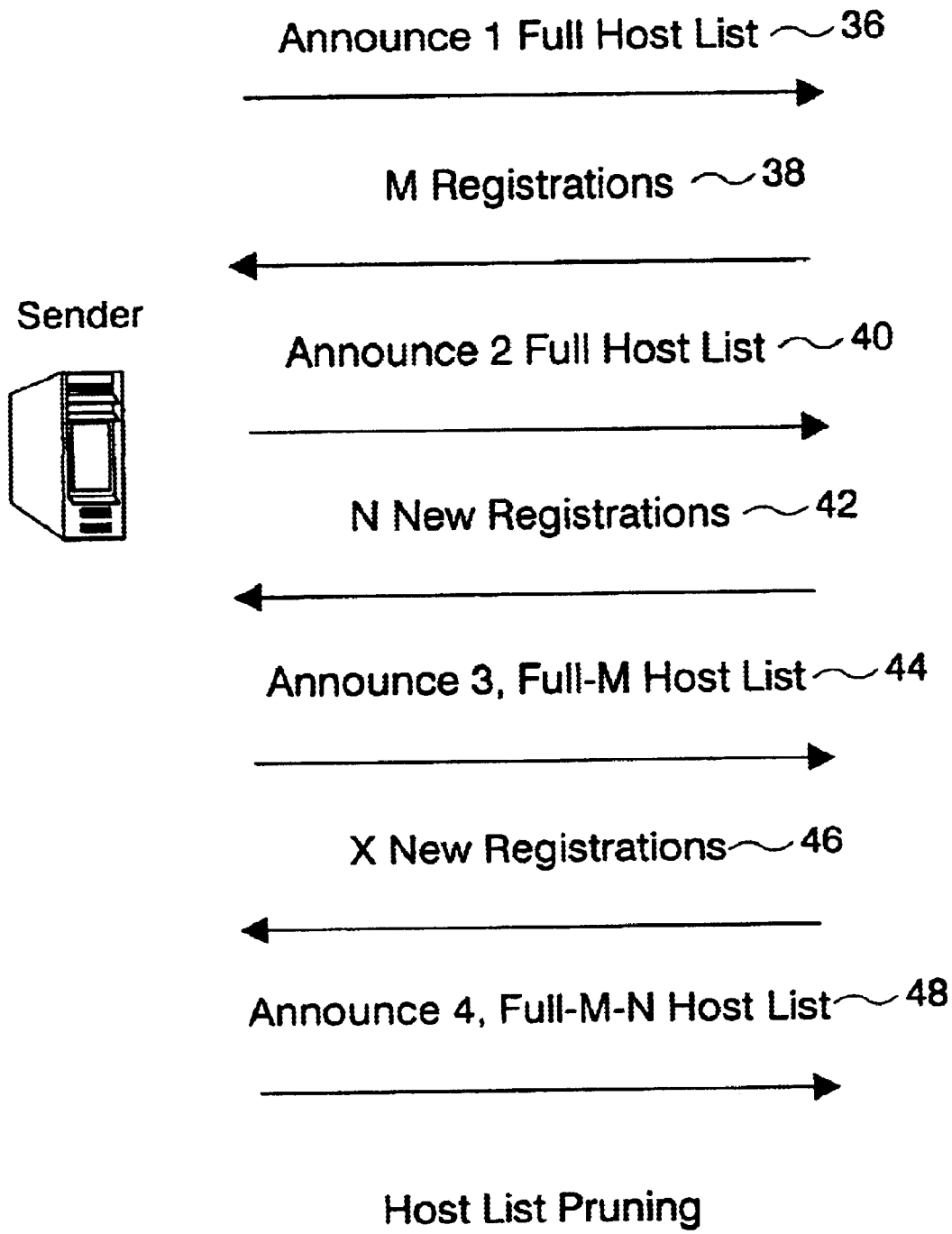
FIG. 3 is a diagram of a host list pruning technique in accordance with one embodiment of the invention.

FIG. 3 is a diagram illustrating the flow of host list pruning for closed groups, in accordance with one embodiment of the invention. In the first ANNOUNCE message (step 36), the total list of hosts directed to join is included. This could be as high as 10,000 or higher. For a packet size of 1500 bytes, a common number as it is the maximum for Ethernet, about 60 ANNOUNCE packets need to be sent to convey all 10,000 host list members. However, one skilled in the art will recognize that as the packet size varies, the number of ANNOUNCE packets sent will, of course, vary as well. Receivers receive ANNOUNCE messages and look for their IP address or Global ID if so configured.

It should be understood that, in some embodiments of the invention, the ANNOUNCE message can convey more information to receivers than simply the list of receivers that it wishes to join for the session. For example, in some embodiments, the ANNOUNCE options convey to the receivers the type of group, whether to leave the private address when the session is over, whether the transmission is an initial one or a "restart," and whether to overwrite an existing file of the same name or not. In addition, in still other embodiments, the ANNOUNCE helps to ensure that the message is actually received by the clients because it is transmitted more than once. In another embodiment, subsequent transmissions of the ANNOUNCE message serve to confirm receipt of REGISTRATION messages received from clients by the setting of a flag per client in the message. In still another embodiment, the announce duration allows clients that are experiencing problems (e.g., insufficient disk space) to resolve those problems and still register for the product transfer.

When using a closed group, because all of the members of the group are known, the very first ANNOUNCE message may contain a host list. The host list is included for a closed group to identify those clients that are directed to participate in the product transfer. When using open limited groups, the host list usually is not included in the initial ANNOUNCE message. However, with open limited groups, the host list is included in subsequent messages to confirm those clients that have registered. Note that a host list is never included in an ANNOUNCE message for an open unlimited group.

Upon seeing the ANNOUNCE message at the group address, the receivers designated to join the group register with the sender sending a REGISTRATION message (step 38), unless there is some legitimate reason not to, e.g., there is not enough disk space to store the transmission or the receiver has been configured to reject content from that source. In these cases, the client sends back a REGISTRATION message with a "Decline" code (not shown).

For example, receivers that are members of a closed group are required to register with the server 10 (see FIG. 1) when they have seen the ANNOUNCE message. When a closed group receiver sees the ANNOUNCE message, the receiver verifies that it is associated with the group identified in the message. In one embodiment, it is implicit in the receiver being able to process the ANNOUNCE message that the receiver has a correct server IP address and a correct port number. As is explained below, the receivers automatically respond to ANNOUNCE packets that they see at the group address with REGISTRATION packets until they see their address in a host list in a subsequent ANNOUNCE packet. The REGISTRATION packet acts as a positive acknowledgment to the sender about the participation of receivers. In another example, if the ANNOUNCE is for open limited or open unlimited groups and the client does not want to receive the product, then the client sends no response and ignores the ANNOUNCE message.

In some embodiments (not shown in FIG. 3), a server may receive more than one response from a particular client during the same product announcement. In these instances, the last response received is considered to be the client's "official" response. For example, the client may initially decline the transfer due to insufficient disk space. The announce duration may allow the client operator time to resolve the problem. If the client operator frees up disk space, the client may then respond that it will be participating in the transfer. In addition, in still other embodiments (not shown in FIG. 3), the server may receive a QUIT message from the client after the client has registered. After receipt of the sent QUIT message, the server will not consider the client a participant in the product transfer.

After the first ANNOUNCE, the sender collects REGISTRATION messages (step 38) until the second ANNOUNCE is due to be sent. For each received REGISTRATION packet from a receiver, the sender indicates that the receiver has been confirmed in the next transmission of the ANNOUNCE packet. In one embodiment of the invention, the host list is maintained by the server. Confirmations are sent, in another embodiment, at intervals that are configurable by a user at the sender site.

The sender sends the total host list again to confirm reception of Registrations to those that joined and solicit REGISTRATIONS from those not received (step 40). When the receiver sees an ANNOUNCE packet with the receiver's ID in the host list, registration for the receiver is complete.

As was discussed previously, the host list can become very large when large numbers of REGISTRATION packets are received from clients, requiring the server to transmit an increasingly large host list with each ANNOUNCE. For example, for a group of 10,000, an unpruned host list would require 10,000/175 or about 57 packets each time it was sent, and it would likely be sent multiple times as more registration messages are received. For MTU sizes less than 1500, the problem is exacerbated further. This represents a significant scaling problem as groups become large. The host list pruning technique of the present invention, described below, provides a significant improvement to this problem while at the same time providing positive confirmation of registration to receivers.

Rather than send the full host list for each registration confirmation including addresses sent in previous confirmation, the present invention, in one embodiment, performs "host list pruning" to more efficiently confirm registrations. That is, each time the ANNOUNCE is re-sent (which, as described above, serves as a confirmation of registration) after the initial sending of an ANNOUNCE, the size of the host list that is sent along with it shrinks as more registrations are received. Receivers that have been confirmed are removed from the host list, thereby reducing the size of the list that must be sent along with each announce. With "host list pruning", a receiver sending a registration is confirmed only once. Thus, rather than sending the full host list of the total group (or that portion of the group that is connected), this approach removes redundant information from being sent.

Referring again to FIG. 3, after sending the total host list again to confirm reception of REGISTRATIONS to those that joined and solicit REGISTRATIONS from those not received (step 40), the sender collects REGISTRATIONS (step 42) until the third ANNOUNCE is due to be sent (Step 44). This time, however, the host list is "pruned" of those that registered in the period between the first and second ANNOUNCE messages, reducing the Announce packets needed for the third Announce message (step 44). That is, those receivers that registered in the period between the first and second ANNOUNCE messages are removed from the host list. This process continues until all receivers have registered or until the number of Announces configured has expired and results in the host list becoming pruned further on every subsequent Announce sent (Step 48).

Note that the full host list, in this embodiment, initially needs to be sent twice independent of the number of registrations. The first set of REGISTRATIONS are marked as confirmed in the second ANNOUNCE (step 40) and are then pruned from the list in the third announce (step 44). Also, if a receiver does not receive a confirmation within a time-out after sending a REGISTRATION, or if it sees a new ANNOUNCE without a confirmation, indicating that the sender lost its REGISTRATION, the receiver simply sends another REGISTRATION.

The following step by step example explains the pruning of the list in more detail. In step 36 of FIG. 3, the initial ANNOUNCE is sent and it includes a host list of a size "Full." In step 38, "M" registrations are received in response (for this example only, it is assumed that "M" is a number that is less than "Full"). In step 40, the second ANNOUNCE is sent and it includes a host list of size "Full." This second announce serves as a confirmation of registration to all receivers who sent registrations back in step 38. In one embodiment, the host list may provide further indication of confirmation of registration, such as by setting one or more flags in the ANNOUNCE transmission.

Once these receivers are confirmed (e.g., after an ANNOUNCE is sent after their confirmations are received), each confirmed receiver can be removed from the host list. As those skilled in the art will recognize, the receiver can be removed from the list any time between step 40 and step 44. The result is that the host list will be of a size "Full-M". Thus, for example, if the original host list had 100 members, and 25 registrations were received in step 38, the resultant "Full-M" host list sent in step 44 would have 75 members. In step 42, "N" new registrations are received in response to the ANNOUNCE of step 40 (for this example, "N" is a number less than "Full"). In step 44, the pruned host list, of a size "Full-M" is sent along with the third ANNOUNCE. The ANNOUNCE of step 44 serves as confirmation of registration to each of the N receivers that sent responses in stop 42. For example, for a full host list of 100 members, M=25 and N=40, in step 48, the size of the host list would be Full-M-N=35 members.

In one embodiment, the time between the ANNOUNCE messages of steps 36, 40, 44, 48, etc., of FIG. 3 is configurable. In another embodiment, an ANNOUNCE message is sent periodically during the ANNOUNCE phase. In still other of these embodiments, the transmission interval is specified by an announce interval parameter, and the duration of the ANNOUNCE phase is specified by an announce time limit parameter. In yet another embodiment, a specific time limit is allocated between announces; essentially, it is the time allowed to collect registrations until the next announce.

In still other embodiments, the total number of ANNOUNCE messages that are sent is configurable. Typically, this is the number of announce messages that are sent before the ANNOUNCE phase is complete. However, there actually is one more ANNOUNCE to confirm those receivers that register after the last ANNOUNCE.

In another embodiment, the rate of data transfer can be configured during the ANNOUNCE phase. This can be useful, for example, when a sender wishes to send a long transfer at a low rate in the background, but wishes to have the ANNOUNCE sent quickly so that knowledge of group membership happens rapidly. This helps to minimize the length of the ANNOUNCE phase. This is particularly applicable to the closed group model where members of the group register back to the sender to inform the sender of their presence.

In yet another embodiment, the time duration of the ANNOUNCE phase is derived based on one or more of the group size, configured time between announces, configured total number of announces, and rate for the ANNOUNCE phase. In one embodiment, the total number of announces that can be sent is configurable.

Figure 4A:
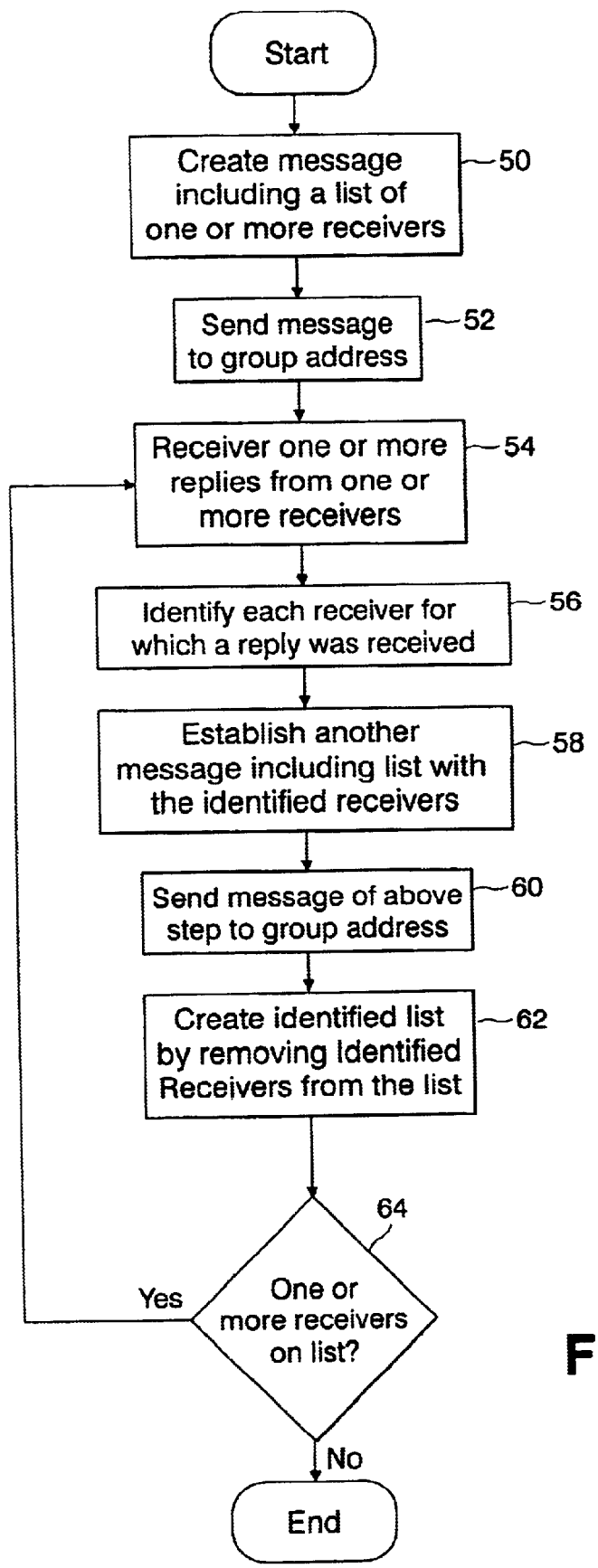
FIGS. 4A and 4B are flow charts of closed group host list pruning, at the sender and receiver sides, respectively, in accordance with one embodiment of the invention.

FIG. 4A is a flow chart of a host list pruning method for closed groups, from the perspective of the sender, in accordance with one embodiment of the present invention. First, the sender creates a message that includes a list of one or more receivers (step 50). This list comprises the members of the closed group. In some embodiments of the invention, the message comprises the ANNOUNCE message described above and the list comprises a host list. Next, the sender sends this message to the group address accessible to each receiver on the list (step 52). When the sender receives replies from one or more of the receivers (step 54), it identifies each receiver from which it received a reply (step 56). In one embodiment, this identification comprises setting a flag on the list. However, other techniques for identifying receivers may be used, as is understood by those skilled in the art.

The list of identified receivers is added to another message (step 58) and this message is sent to the group address that is accessible to each receiver on the list (step 60). This message acts as a confirmation of registration to the identified receivers, in a manner similar to the ANNOUNCE sent in step 40 of FIG. 5. Next, the sender creates a modified list by removing identified receivers from the list (step 62). Effectively, step 62, the list is "pruned" of receivers whose registration has been confirmed. If one or more receivers are still remaining on the list (step 66), steps 54 through 66 are repeated. Thus, for each confirmation received from a receiver (step 54), an announce is sent that includes a list where that receiver is identified (step 60).

Figure 4B:
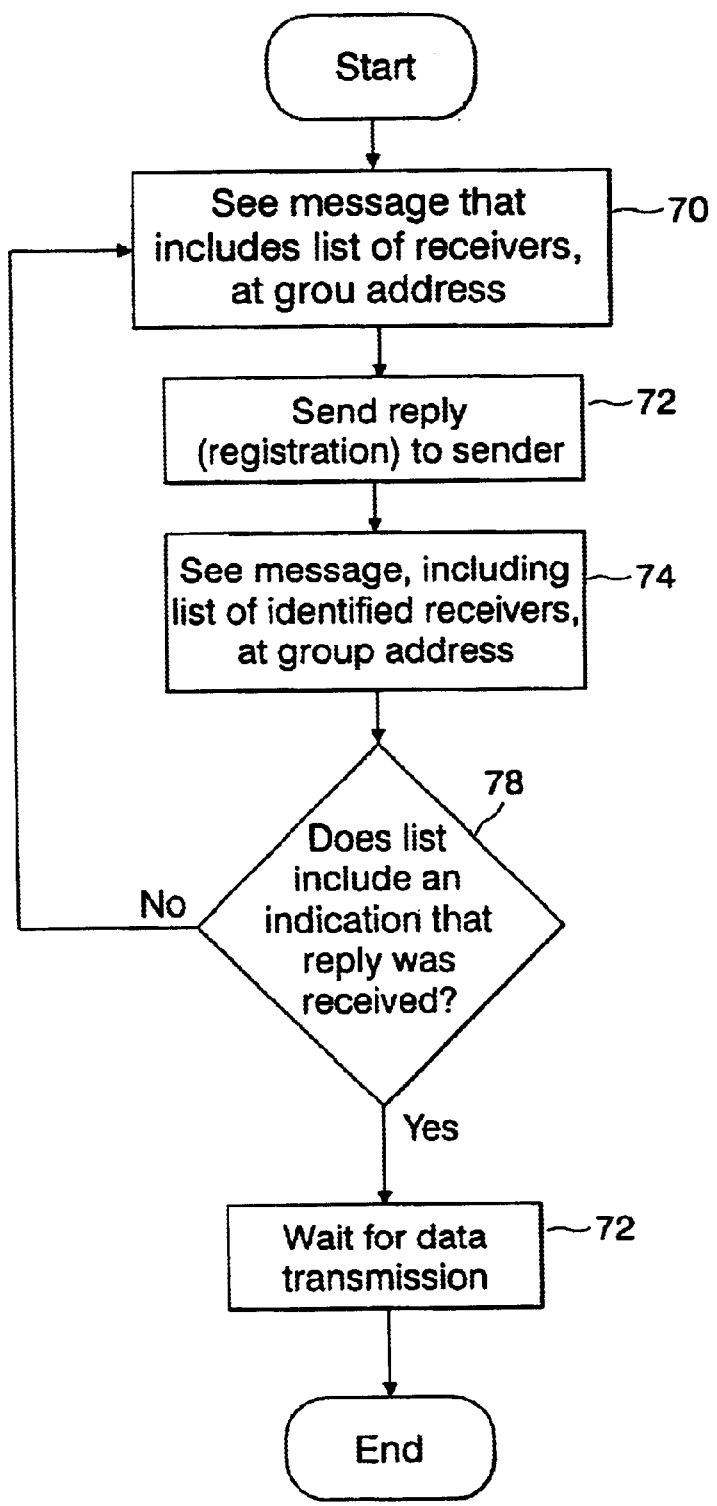

FIG. 4B is a flow chart of the host list pruning method for closed groups, as seen by the receiver. Initially, the receiver, which is listening at the group address, sees at the group address a message from the sender, the message including a list of receivers (step 70). In one embodiment of the invention, the message includes an invitation to receive a data file. In other embodiments, when the receiver sees an ANNOUNCE message, it examines the product information contained in the message and compares it with the requirements set by its application layer user(s). That is, it is expected that the application layer will designate the senders that it is interested in receiving from and the types of data products that it wants to receive. The application may also select only particular sources to receive product from and reject those not selected. Based on this information, the receiver of this embodiment decides whether or not to receive the announced product.

In another embodiment, a receiver can choose to reject the data offered in an ANNOUNCE message for other reasons, such as if the receiver does not have adequate memory to receive the data. In another embodiment, if the receiver is not going to participate, a reason is provided in the message that it sends back as a reply to the sender. This allows the sender to track problems in the group. However, by way of example only, the receiver in FIG. 4B is choosing to receive the data file. Thus, the receiver sends a registration back to the sender (step 72).

After the receiver sends a registration to the sender (step 72), the receiver monitors the group address to see if a message is received from the sender (step 74). Generally, the message received in step 74 will include a list with identified receivers. However, in some instances, if the receiver did not see its identification in any responses to the first message (for example, if a data error occurred), the list of identified receivers will not have any identified receivers listed on it. The receiver of FIG. 4B, however, is concerned with whether the registration that it sent was received by the sender (step 76). If it was not, then the receiver continues to send registrations to the sender until the list indicates that the reply was received (steps 72 through 76). When the list contains an indication that a reply was received, the receiver stops sending replies and waits for the sender to transmit data to it (step 78).

For open limited groups, host list pruning operates similarly to the way it does with closed groups, with the differences that are explained below, in connection with FIGS. 5A and 5B.

Open limited groups permit a sender to announce a transmission without specifying the receivers that are authorized to receive the data. This may be because the sender does not know in advance which receivers may want to receive the data, or the number of potential receivers may be very large. Thus, any receiver/host listening on the ANNOUNCE multicast address may join the group until a predetermined condition exist. In one embodiment, this predetermined condition comprises a time-out period. In another embodiment, the predetermined condition comprises an a limit on the size of the group. In still another embodiment, the predetermined condition is based on criteria determined by the application running at the sender. When the predetermined condition is reached, the transmission of the data starts as in closed groups.

Figure 5A:
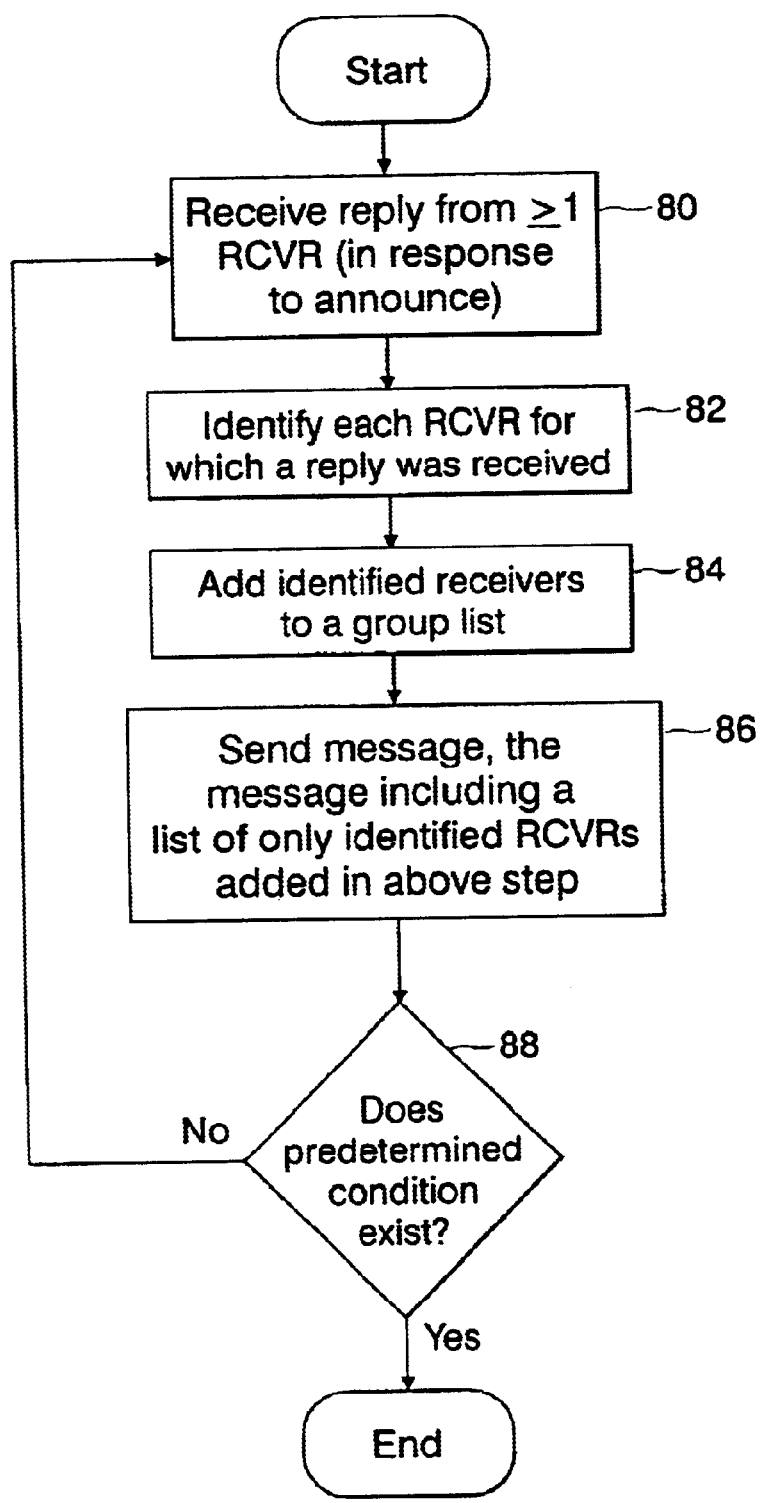
FIGS. 5A and 5B are flow charts of open limited group host list pruning, at the sender and receiver sides, respectively, in accordance with another embodiment of the invention.

FIG. 5A is a flow chart of host list pruning, at the sender end, for open limited groups. In response to an ANNOUNCE message sent by the sender (not shown), the sender receives replies from one or more receivers (step 80). In one embodiment, the ANNOUNCE message comprises an invitation to receive data and the reply comprises a registration to receive that data. For the purpose of example, in FIG. 5A it is assumed that the replies from receivers are intended to be REGISTRATION messages and not other types of messages. The sender identifies each receiver that replied to the announce (step 82) and adds the identified receivers to a group list. The group list is used so that the sender can keep track of receivers that want to receive data. Essentially, when all receivers have registered, the group list functions similarly to a closed group, in that the list of receivers to whom data will be sent is known and fixed.

Next, the sender sends a message that includes a list of only the receivers that were identified in step 84 (step 86). This message serves as a confirmation to the receivers that replied in step 80. Note also that the list of step 86 initially may be the same as the group list of step 84. However, as more replies are received from receivers, the group list size will grow, but the list of step 86 will include only those receivers that most recently replied in step 80. That is, the list of step 86 will be constantly "pruned" of receivers that were already identified and confirmed. The sender will continue to receive replies (and add to its group list) until a predetermined condition exists. The predetermined condition can, in some embodiments, comprise a limit on the group size, as described above. In another embodiment, the predetermined condition can comprise a time period or time limit. In yet another embodiment, the predetermined condition can comprise a limit on the number of times that an ANNOUNCE message or a confirmation message is sent. In another embodiment, the predetermined condition can comprise an error condition, such as an error at the sender, and error at the receiver, or a network error.

Figure 5B:
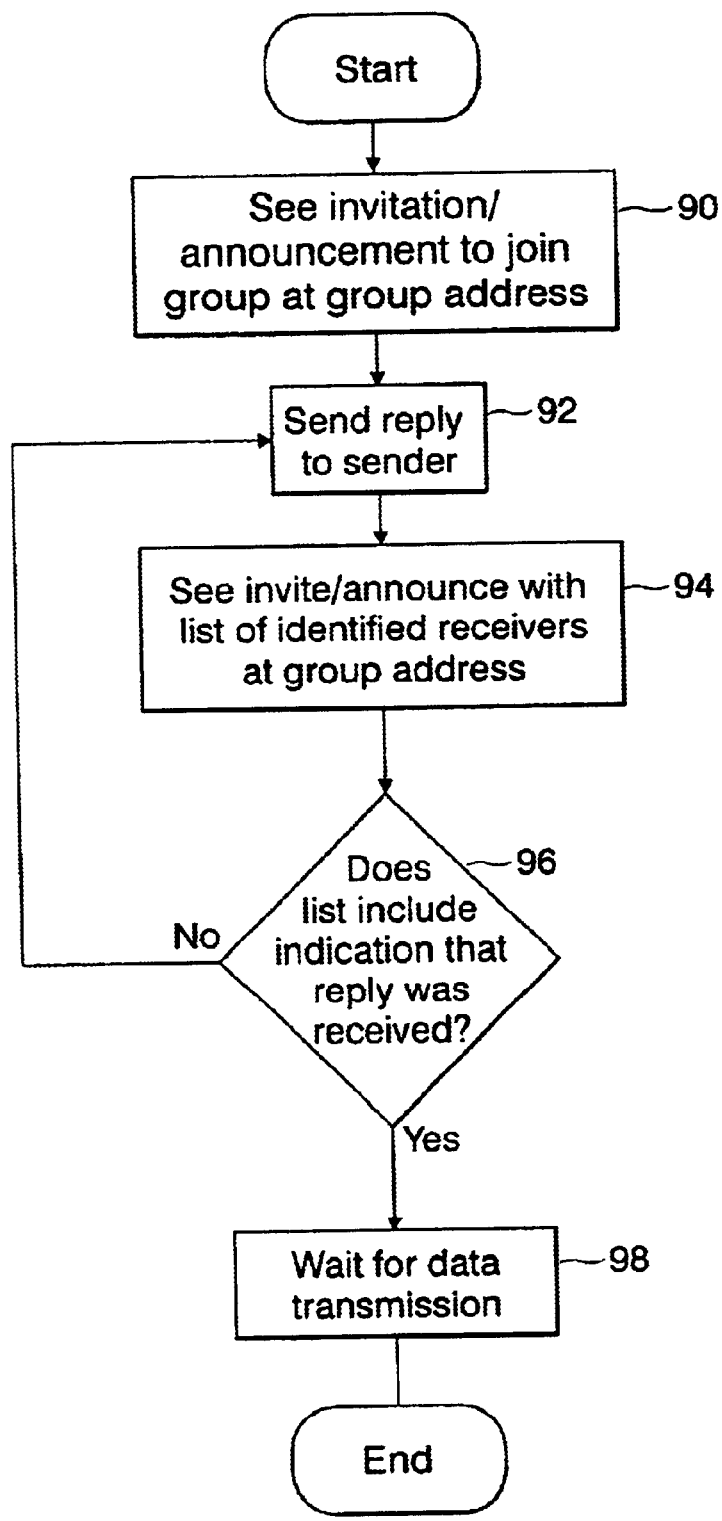

FIG. 5B is a flow chart illustrating the operation of host list pruning with open limited groups, from the perspective of the receiver. Because steps 90 through 98 of FIG. 5B are substantially similar to steps 70 through 78, respectively, of FIG. 4B, discussion of their details is not repeated here.

In addition, as noted previously, file transfer is substantially the same for both closed groups and open limited groups. Transfer of the file is also referred to as the product delivery phase. The session ends when all receivers have acknowledged completion with a DONE message or when a configurable time-out occurs, whichever comes first. Product completion is the process of terminating a product transfer. File product completion for the client is discussed first, since it is the client that normally initiates the completion procedure.

As each DTU is received, the receiver determines if it has now received the entire file. If not, data reception continues.

Otherwise, for closed and open limited groups, at the end of transmission, DONE messages are sent from the receivers to the sender, confirming delivery. For closed and open limited groups, the receipt of a DONE message from a receiver means that the receiver has received all of the file successfully. For open groups, the receiver simply returns to the IDLE state without sending any message to the sender.

After sending a DONE message, the receiver waits for receipt of a COMPLETION message from the sender. The Sender confirms the receipt of DONE messages with the COMPLETION message. However, a separate message is not sent for each DONE received. Rather, a host list is used to "batch-confirm" all DONE messages that have been received up to the time that the COMPLETION message is sent. Like the ANNOUNCE message, the completion message is sent to an address accessible to receivers, such as a group address.

Thus, if the receiver sees a COMPLETION message and its address is in the host list, then the transfer is complete. In one embodiment, the receiver leaves the data delivery group and returns to the IDLE state after seeing a COMPLETION message. Otherwise, the DONE message is resent. The DONE message is also resent for each status request message received from the sender. This procedure continues until the receiver's DONE message is confirmed or until the receive timer expires.

In another embodiment of the invention, the first COMPLETION message is sent as soon as the first DONE message is received, and periodically thereafter at intervals specified by a completion interval parameter. When a COMPLETION message is sent, an interval timer is started. When the timer expires, the sender updates the host list of the message with all receivers that have sent DONE messages and sends the message again. If all receivers have not yet completed receiving data, the timer is restarted. In this embodiment, there must be at least one additional transmission of the COMPLETION message after the last receiver has indicated that it has completed receiving data.

In one embodiment of the invention, the COMPLETION message can be sent while file transfer is still in progress. This can occur when receivers experience different network error rates, such that some receivers may complete the transfer while other receivers are still receiving retransmissions.

Data delivery continues until there are no longer any participating receivers (all have sent DONE or QUIT messages) or there is no response from any receiver, whichever occurs first. In one embodiment, data delivery continues until a delivery time limit duration has expired. When the last receiver completion has been confirmed with the COMPLETION message, the sender considers the transfer complete and sends no further messages.

During the completion processing described above, as more and more receivers send DONE messages to the sender, the host list on the COMPLETION message also may increase in size. Accordingly, the host list pruning technique used with the ANNOUNCE phase can be used to improve efficiency during completion processing.

Figure 6A:
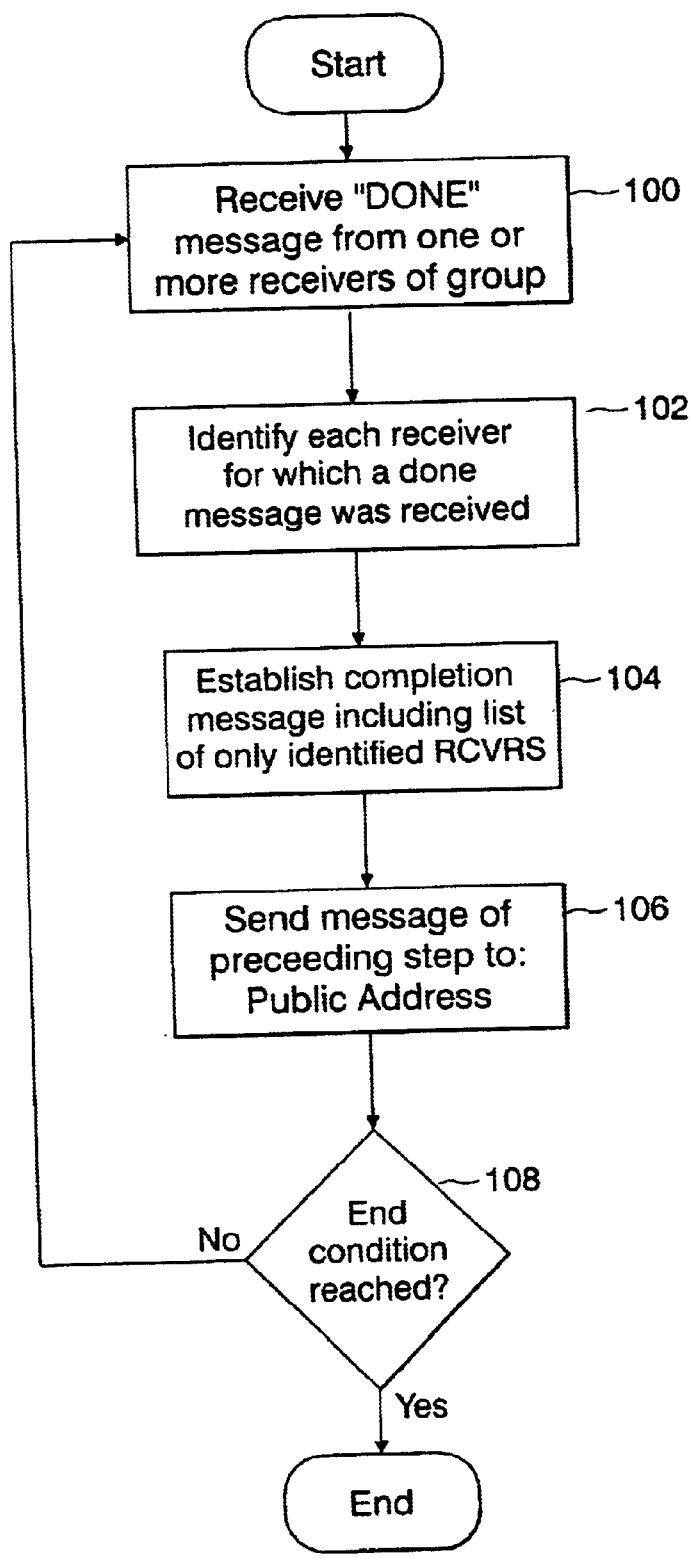
FIGS. 6A and 6B are flow charts of completion list pruning, at the sender and receiver sides, respectively, in accordance with an embodiment of the invention.

FIG. 6A is a flow chart of a method for host list pruning during completion, as seen by the sender, in accordance with one embodiment of the invention. A sender receives at least one DONE message from a receiver (step 100) that is part of a group of receivers that received data from the sender. In some embodiments, the sender will receive a "batch" of DONE messages during a predetermined time interval that it waits for DONE messages. As is described below, the group of receivers functions similarly to the host list of FIGS. 4A and 5A.

Because the sender knows the receivers to which it sent data, it can identify the receiver that sent the DONE message (step 102). The sender then creates a COMPLETION message that includes a list of the receivers that it identified as sending a done message in step 100 (step 104). That is, this list includes only the receivers that most recently sent a DONE message, not every receiver that has ever sent a DONE message. The sender sends this COMPLETION message to the public address accessible to each receiver in the group (step 106). Steps 100 through 106 are repeated until an end condition is reached. That is, the sender continues to receive DONE messages, identify the receivers that are done, and send out COMPLETION messages confirming the receivers identified as completed. The predetermined condition can comprise, in various embodiments, one or more conditions including a time limit, a limit on the number of times that a COMPLETION message is sent, and the receipt of a DONE message from all receivers in the group.

Figure 6B:
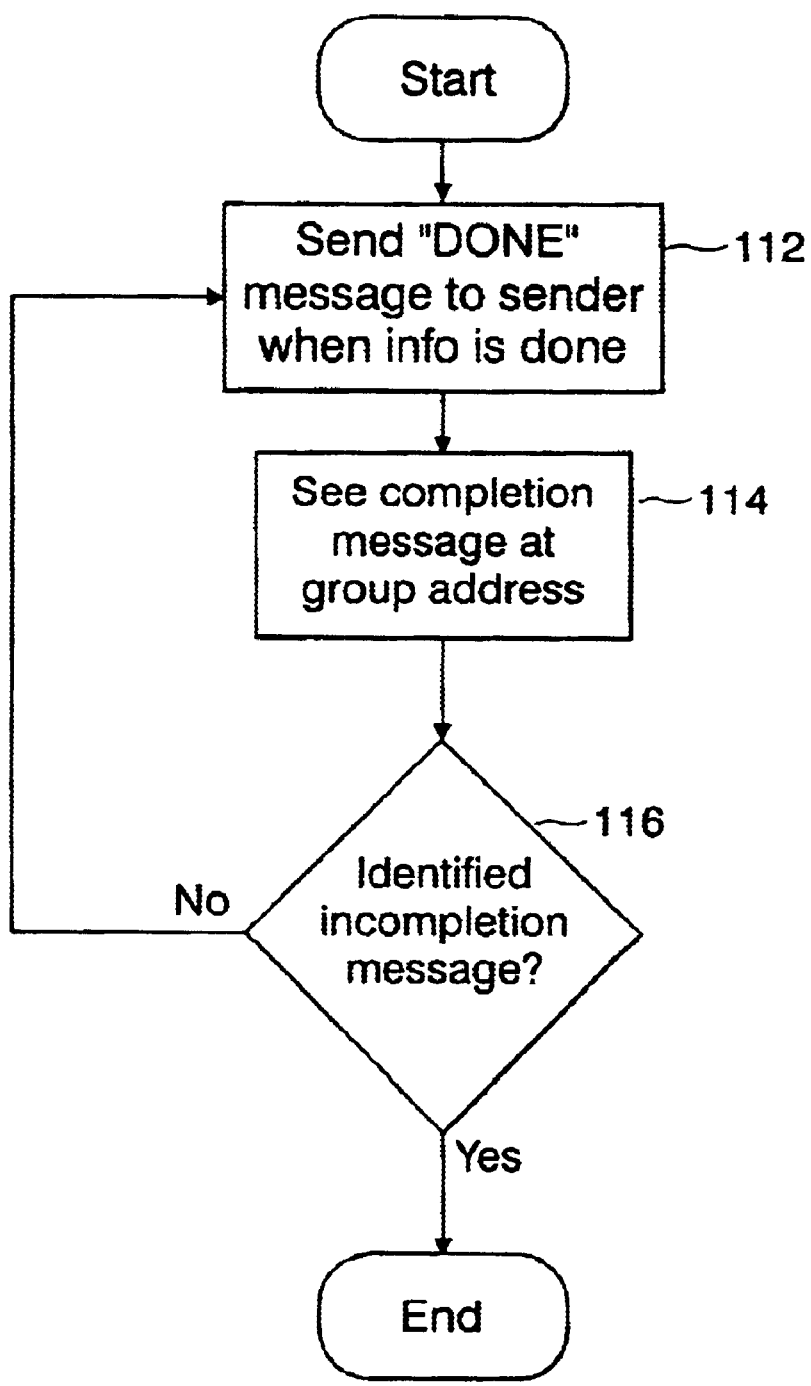

FIG. 6B is a flow chart of a method for host list pruning during completion, as seen by the receiver, in accordance with one embodiment of the invention. When the receiver has received all of the data in the transmission, it sends a DONE message to the sender (step 112). When the receiver sees a COMPLETION message from the sender (step 114), it checks the message to see if it is identified as being confirmed complete (step 116). If not, the sender resends the DONE message (step 112), and keeps doing so until it sees itself in the COMPLETION message.

In another embodiment (not shown in FIG. 6B), the receiver will continue sending DONE messages only until some predetermined condition is reached, such as a timeout, a limit on the number of DONE messages, or a limit on the number of COMPLETION messages.

The following example illustrates how host list pruning can assist in a useful, real-world application. Many retailers have geographically dispersed stores connected by networks. A central server is responsible for transmitting information to each of the stores over a computer network. The information can relate to particular advertising that might be displayed in a store, software and applications used at the store, inventory information, and the like. Thus, for example, when a store has a weekly sale, the new sale prices for items sold in the store must be transmitted to the computers at each store, so that the cash registers will scan the proper sale prices. In this example, the geographically dispersed stores function as a closed group to which the server can an invitation to receive the new sale prices. A data file may contain a list of the new sale prices.

For particularly large chains of retailers, the individual stores to which information must be sent can number in the thousands. Thus, during an ANNOUNCE phase, the server must receive and confirm thousands of responses before it can begin to send the data file of sale prices out to the stores. Because the data file of sale prices is likely to be quite large, itself (because it contains product, bar code, and price information, for example), the retailer wants to spend as little time as possible informing each of its stores that it is sending price changes and receiving confirmation that each store is ready to receive the price changes. Instead, the retailer will need the bulk of the time to transmit the data file of sale prices itself. To minimize the time taken to send an ANNOUNCE message relating to price changes, host list pruning can be used to quickly and efficiently reduce the size of the host list of stores that accompanies each announce message. By reducing the size of the ANNOUNCE message, it can be sent more quickly. Thus, the important information (i.e., the price chances) can be transmitted as soon as possible.

Exception Report Processing

In another aspect of the invention, a technique called exception reports processing can be used to make registration, confirmation, and completion more scaleable. This solution generally requires a priori knowledge of the members of the group, so, although it works for registrations with closed groups, it does not work for registrations in the open limited group model where the sender learns of the members of the group as receivers register. It does work, however, for completion processing for both closed and open limited groups, as members of the group are known.

In most instances, members of a group will register after seeing an ANNOUNCE and finish receiving data without problems. Thus, a sender typically will have received REGISTRATION messages from most group members after a first couple of ANNOUNCE messages have been sent. Similarly, the sender can expect to receive DONE messages at the end of the first pass from a significant number of receivers and selective reject NAK messages from others.

As more ANNOUNCE messages are sent, more registrations are received. In the closed group model, all the group members are known. Thus, rather than sending a confirming host list, as described previously, in another embodiment of the invention, an "exception report" can be sent instead. Instead of containing a list of the confirmed registrations (as was described in connection with host list pruning), the exception report contains, in one embodiment, a list of those receivers from whom no registration has been received. Thus, as more receivers register, the exception report shrinks until an announce time-out or until all receivers register. In another embodiment (used during completion), the exception report contains not a list of those receivers who are confirmed complete, but instead a list of those receivers from who the sender has received NAKs (indicating not all data was received).

Similarly, in the data transmission phase (for either closed or open limited group models), as the NAKs are serviced, more DONE messages are received. Exception reports rather than confirming host lists are sent to confirm completion. The exception report is likely to be much smaller than the a host list and could even be zero if all receivers have responded. Additionally, the exception report, in another embodiment, is held back until near a time-out period for the session so that the number sent is minimized and the exceptions are minimized.

In one embodiment, status report messages, which are used to trigger NAKs, are sent until a percentage of the group has responded and/or some predetermined time in the session is reached. At this point, an exception report is sent and will continue to be sent until time-out of the session or until all have completed at some frequency that is preconfigured.

In another embodiment, the exception report can span multiple packets. In these instances, one of the multiple packets can get lost at a particular receiver and that receiver may not get the information that it is in the exception report. In that case, the receiver could believe that it is done when the sender believes that it is not. As a solution, by having multiple packets have sequence numbers, if one of the sequence is lost, the receiver can send another DONE message if it is finished. Otherwise, the receiver can send a NAK packet indicating that repair is needed.

Figure 7:
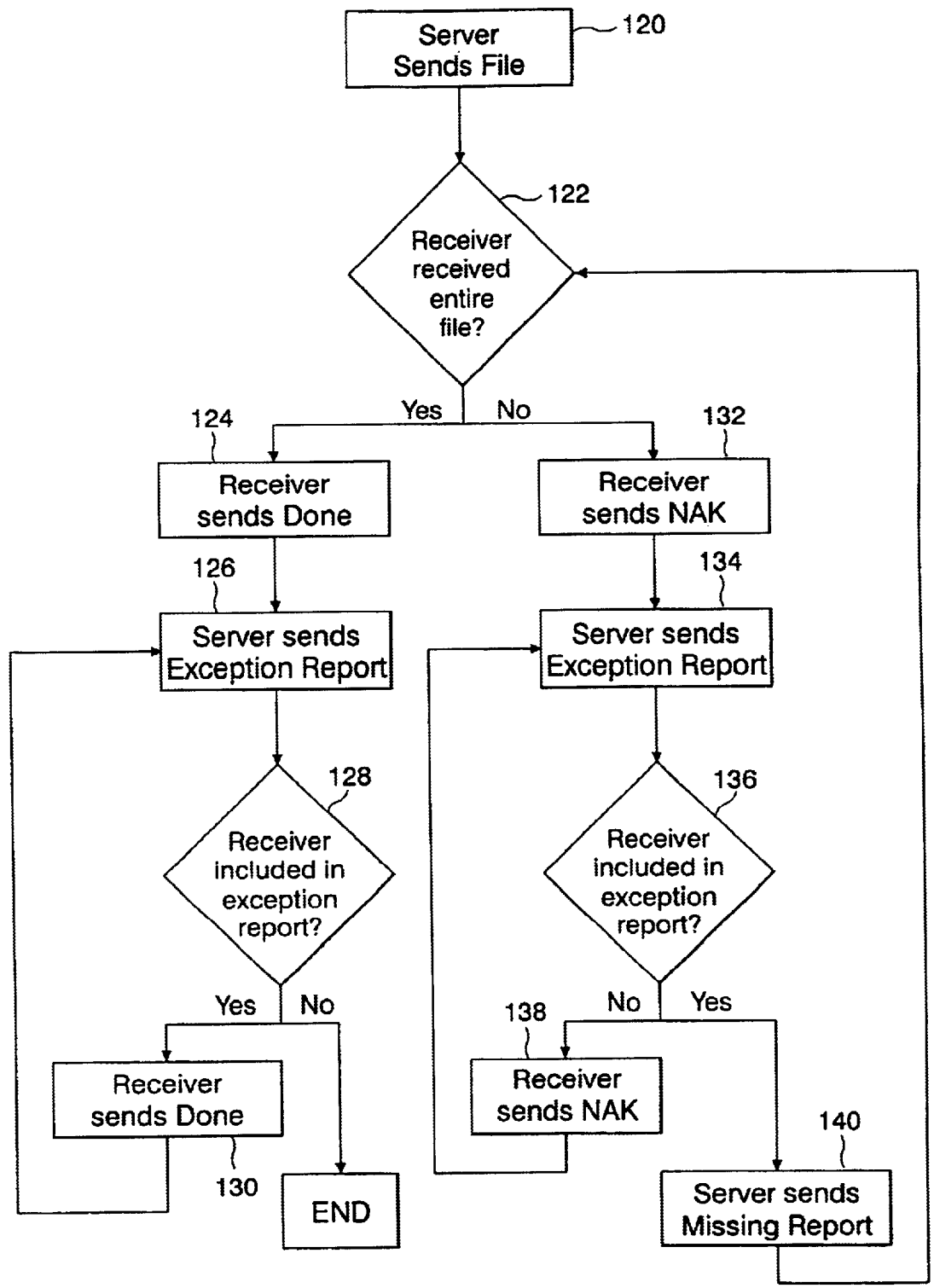
FIG. 7 is a diagram of an exception report system, in accordance with the invention.

FIG. 7 is a flow chart of the exception report processing as used during completion, in accordance with one embodiment of the invention. When a sender sends a file (step 120), if the receiver has received the entire file (step 122), then it sends a DONE message to the sender (step 124). At a particular time, the sender sends an exception report to the address accessible to the receivers (step 126). The receiver checks the exception report to determine if it was identified there; that is, does the sender think that the receiver is not complete (step 128). If the receiver does not see its name on the exception report, then the receiver can infer that the sender received its DONE message, so the receiver can stop communicating with the sender. If, however, the receiver sees itself included on the exception report (step 128), then the receiver sends another DONE message to the sender (step 130) and awaits the next exception report (step 126). This process will continue, in this embodiment, until the receiver does not see itself on the exception report. In another embodiment, this continues until some other predetermined condition is reached, such as a time limit, limit on the number of DONE messages, limit on the number of exception reports, error condition, and the like.

If the receiver did not receive the entire file from the sender (step 122), the receiver sends a NAK to the sender (step 132). When the sender sends an exception report to the receiver (step 143), the receiver looks for its name on the exception report (step 136), to verify that the sender knows that it has not received all of the data. If the receiver's name was not included on the exception report, the receiver continues to send NAKs to the sender (step 138) until it sees its name on the exception report. In another embodiment, the receiver continues to send NAKs until some other predetermined condition is reached, such as a time limit, limit on the number of NAK messages, limit on the number of exception reports, error condition, and the like.

If the receiver's name was included on the exception report, then the sender sends the receiver the missing data (step 140), and the receiver then waits to receive the entire file (step 122). After receiving the entire file, the DONE processing proceeds as described above.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method of managing a list of receivers, comprising:
   (a) creating a message that includes a list of one or more receivers;
   (b) sending the message over a network;
   (c) receiving over the network one or more replies from one or more of the receivers;
   (d) identifying each receiver for which one of the replies was received and establishing another message that includes the list with the identified receivers;
   (e) sending the message established in step (d) over the network;
   (f) creating a modified list by removing the identified receivers from the list; and
   (g) if there are one or more receivers on the modified list, repeating steps (c), (d), (e), (f), and (g) using the modified list as the list.

2. The method of claim 1 wherein, in steps (b) and (e), the message is sent to a group address location accessible to the receivers.

3. The method of claim 1 further comprising:
   (h) establishing a confirmed list that includes all of the identified receivers; and
   (i) transferring data over the network to the identified receivers on the confirmed list.

4. The method of claim 1 wherein all of the steps are performed by a sending computer on the network.

5. The method of claim 4 wherein the sending computer comprises a server 10.

6. The method of claim 1 wherein, in step (c), the replies are received in response to the most recently sent message.

7. The method of claim 6 wherein, in step (e), the message is sent a predetermined amount of time after the most recently sent message.

8. The method of claim 1 wherein step (g) is repeated for a predetermined amount of time.

9. The method of claim 1 wherein step (g) is repeated until a predetermined number of the messages have been sent.

10. The method of claim 3 wherein the message sent in step (b) comprises an invitation to the receivers on the list to confirm an interest in receiving the data over the network.

11. The method of claim 1 wherein the messages sent in steps (b) and (e) are multicast messages.

12. The method of claim 1 wherein the lists include Internet protocol (IP) addresses for the receivers.

13. The method of claim 1 wherein the lists include global identifiers for the receivers.

14. The method of claim 13 wherein each of the global identifiers has a Class E IP address format.

15. A method of managing a list of receivers to establish a group list, comprising:

(a) receiving over a network one or more replies from one or more receivers;

(b) identifying each receiver for which one of the replies was received in step (a);

(c) adding the receivers identified in step (b) to a group list;

(d) sending a message over the network, the message including a list of only the identified receivers added to the group list in step (c); and (e) repeating steps (a), (b), (c), (d), and (e) until a predetermined condition exists.

16. The method of claim 15 wherein the predetermined condition comprises the end of a predetermined period of time.

17. The method of claim 15 wherein the predetermined condition comprises a predetermined number of identified receivers on the group list.

18. The method of claim 15 wherein the predetermined condition comprises a predetermined number of times that the message is sent in step (d).

19. The method of claim 15 wherein the predetermined condition comprises a predetermined error condition.

20. The method of claim 15 further comprising transferring data over the network to the identified receivers on the group list.

* * * * *